(12) United States Patent
Kim et al.

(10) Patent No.: US 6,584,199 B1
(45) Date of Patent: Jun. 24, 2003

(54) CONDITIONAL ACCESS SYSTEM AND METHOD THEREOF

(75) Inventors: In Hun Kim, Taegu-kwangyoksi (KR); Kuk Ho Bae, Kyungsangbuk-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/222,929

(22) Filed: Dec. 30, 1998

(30) Foreign Application Priority Data

Dec. 31, 1997  (KR) ............................................. 97-80717

(51) Int. Cl.[7] .............................................. H04N 7/167
(52) U.S. Cl. ...................... 380/203; 380/231; 380/233; 380/234
(58) Field of Search ................................ 380/203, 231, 380/233, 234

(56) References Cited

U.S. PATENT DOCUMENTS

| | | | | |
|---|---|---|---|---|
| 5,420,866 A | * | 5/1995 | Wasilewski | 380/212 |
| 5,719,937 A | * | 2/1998 | Warren et al. | 380/203 |
| 5,742,681 A | * | 4/1998 | Giachetti et al. | 380/212 |
| 5,799,081 A | * | 8/1998 | Kim et al. | 380/203 |
| 5,802,063 A | * | 9/1998 | Deiss | 380/241 |
| 5,852,290 A | * | 12/1998 | Chaney | 235/492 |
| 5,870,474 A | * | 2/1999 | Wasilewski et al. | 380/211 |
| 6,035,037 A | * | 3/2000 | Chaney | 380/227 |
| 6,035,038 A | * | 3/2000 | Champinos et al. | 380/228 |
| 6,040,850 A | * | 3/2000 | Un et al. | 725/68 |

* cited by examiner

*Primary Examiner*—Gilberto Barrón
*Assistant Examiner*—Kambiz Zand
(74) *Attorney, Agent, or Firm*—Birch, Stewart, Kolasch & Birch, LLP

(57) ABSTRACT

A conditional access system (CAS) for processing signals between a pay broadcast management system and a digital receiver includes a resource subscriber management system (RSMS) for predetermining time(s) when to transmit an RCM and/or EMM for checking information on the amount used, informing each receiver of the time(s) via a satellite channel, and transmitting the RCM and/or EMM to each receiver at the predetermined time(s); and a receiver which is automatically turned on at a predetermined time to receive and decode the RCM and/or EMM and then transmit the information on the amount used to the RSMS and automatically turned off after completion of the transmission to the RSMS. Alternatively, the CAS includes: an RSMS for previously informing each receiver of a transmission time(s) for an RCM and/or EMM which are/is non-periodically transmitted at a predetermined time(s) via a satellite channel and transmitting the RCM and/or EMM; and a receiver for storing the informed transmission time information, being automatically turned on if it is a time stored to receive and decode the RCM and/or EMM and transmit information on the amount used to the RSMS, and being automatically turned off after completing the transmission of the information.

13 Claims, 5 Drawing Sheets

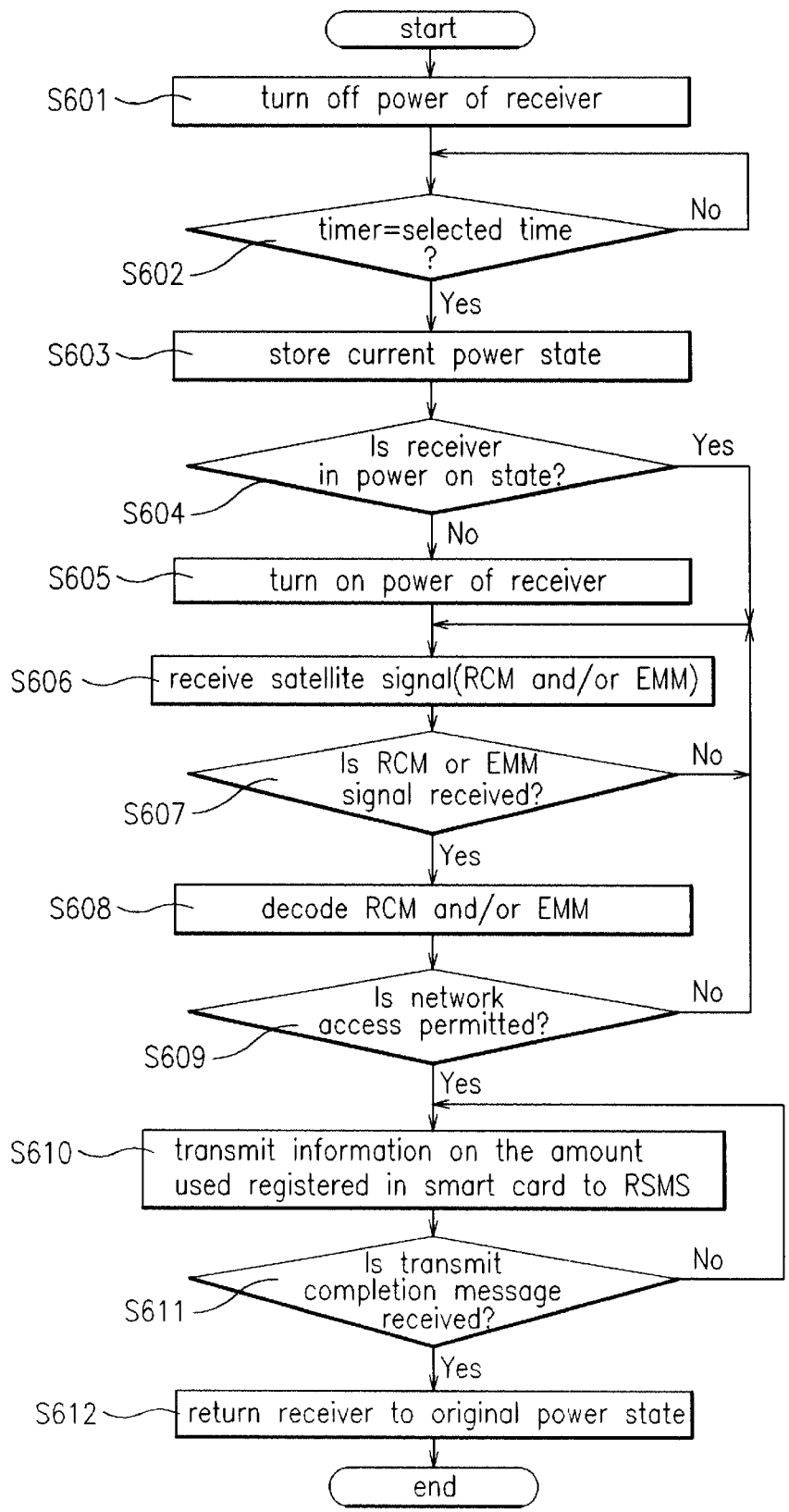

CONDITIONAL ACCESS SYSTEM AND METHOD THEREOF

BACKGROUND OF THE INVENTION

1. Field of the Invention

The present invention relates to a pay broadcast management system and a signal process of a digital receiver and more particularly to a conditional access system (CAS) and method for sending messages from a pay broadcast management system at a specified time and powering on a digital receiver at a predetermined time to allow the digital receiver to receive the messages.

2. Description of Related Art

Typically, broadcast and communication service providers employ a CAS to directly charge fees on use of services with respect to users. For example, as a subscriber management system of the service providers, there is a receiver having a built-in CAS.

There are three types of services requiring subscriber management in the broadcast and communication services: i) a pay per channel; ii) a pay per view (PPV); and iii) an additional service. The pay per channel service charges a predetermined receiving fee on a channel subscribed for and allows for subscribers to watch the programs broadcasted over a relevant channel. The PPV service charges a receiving fee per program taking account of receiving time. The additional service charges a fee on other services supplied via a program as well as a receiving fee on the program. The CAS should operate so that the three types of services can be separately managed.

For this, the CAS assigns a unique encryption or address to each receiver, inputs the unique encryption into a decryptor along with a particular encryption contained in a broadcast signal, detects a new encryption in accordance with a specific calculation method, and reconstructs original signals from broadcast signals which have been scrambled to interfere with reception by a spotter in a sending party using the detected encryption. Accordingly, the CAS comprises an apparatus for allowing only permitted receivers to receive signals and programs and a subscriber management system for pay services. Various methods and principles may be presented depending upon transmission modes and services.

A scrambler/descrambler and an encryptor/decryptor making up the receiver of the CAS are individual apparatus and defined by different national standards. As the scrambler/descrambler, for example, DVB scramblers of DES (Data Encryption Standard) and ETSI (European Telecommunication Standard Institute) in U.S.A. and of ARIB (Association of Radio Industries and Businesses) in Japan are present. The encryptor/decryptor is supposed to be selected and administrated under the responsibility of service providers. For example, there are DSS of Direct TV, Nagra of EchoStar, Nagra of Canal+, and NDS of BskyB. This is because an encryption method depends upon the type of service and a resource subscriber management system of each satellite broadcasting company and must not be administrated under the responsibility of a third party. Each satellite broadcasting company should administrator the CAS having its own special encryptor/decryptor.

As well as present satellite broadcast, satellite broadcast standards of the U.S. or Japan service up link using MODEM as well as down link from satellites. The up link is to transmit used information, i.e., pay broadcast from users to management systems such as a resource subscriber management system (RSMS) through network access. Each receiver is supposed to download a receive control message (RCM) which is a command required for transmission of information on the amount used according to different standards, so the receiver should always be ready for receiving commands such as the RCM. In other words, if information on the amount used in a smart card exceeds 90%, the receiver must inform this information on the amount used to the RSMS. The receiver requests network access and gets a permission for the network access by receiving the RCM message through a satellite thus informing the information on the amount used to the RSMS. Therefore, the receiver should always be "ON" to receive the RCM message transmission of which cannot be predicted.

Since each receiver receives messages for checking information on the amount used by a user from a satellite, parses the messages at the central processing unit (CPU), decodes them with a smart card, and transmits the information on the amount used to the RSMS through MODEM, most parts of the receiver except a part for processing audio/video signals should always operate in a power-on state. The smart card, which is the size of a general credit card and has an IC chip therewithin, receives information related to conditional access (CA) embedded in a bit stream from a broadcasting station via the MODEM, determines that a channel selected by a user or subscriber is permitted to be presented to the user or subscriber, and charges a subscription fee.

The RCM, an entitlement management message (EMM), and the like for managing the information on the amount used are used to check whether or not the receiver is legal and to reset information which has been stored in the smart card, so the transmit and receive of the messages is not performed in a predetermined cycle. In this reason, the receiver should always be powered on.

The RCM and EMM are messages for up-loading of the information on the amount used. When receivers receive a command to regularly report the amounts used with respect to pay broadcast, the receivers may be designed to perform the up-loading at a time after midnight when communication lines are usually not busy or at a predetermined time which is specified by the RSMS.

Accordingly, receivers should always be "ON" to receive these messages. This causes considerable power consumption because each receiver consumes the power even while a user does not intend to watch programs broadcasted through the receiver.

Additionally, if the user cuts off the power while the information on the amount used in the smart card is being transmitted to the RSMS after the receiver received the RCM and was allowed to access the network, transmission of the information on the amount used ends in failure and the above processes should be repeated. If the transmission of the information on the amount used ends in failure more than three times, the smart card may be locked and cannot be used.

SUMMARY OF THE INVENTION

Accordingly, the present invention is directed to a conditional access system (CAS) and method that substantially obviates one or more of the limitations and disadvantages of the related art.

An objective of the present invention is to provide a conditional access system and method for sending an RCM and/or EMM for checking information on the amount used from an RSMS over a satellite channel at a specified time and powering on a receiver at a predetermined time to allow the receiver to receive and decode the RCM and/or EMM and transmit the information on the amount used to the RSMS.

Another objective of the present invention is to provide a conditional access system and method for informing a receiver of a transmission time(s) of an RCM and/or EMM which are/is non-periodically transmitted at a predetermined time(s) via a satellite channel and automatically powering on the receiver at the informed predetermined time(s) which has been stored at the receiver to allow for the receiver to receive and decode the RCM and/or EMM and transmit information on the amount used to an RSMS.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a CAS includes: an RSMS for predetermining a time when to transmit an RCM and/or EMM for checking information on the amount used, informing each receiver of the time via a satellite channel, and transmitting the RCM and/or EMM to each receiver at the predetermined time; and a receiver for checking its power state when a time of a timer coincides with the time informed by the RSMS, automatically being turned on if the receiver is in a power off state to receive and decode the RCM and/or EMM so as to acquire permission for network access and then transmit the information on the amount used to the RSMS, and automatically being turned off after completion of the transmission to the RSMS.

In another embodiment, the CAS of the present invention includes: an RSMS for previously informing each receiver of a transmission time(s) of an RCM and/or EMM which are/is non-periodically transmitted at a predetermined time(s) via a satellite channel and transmitting the RCM and/or EMM; and a receiver for storing the informed transmission time information, checking its power state when a time of a timer coincides with the time stored therein, being automatically turned on when the receiver is in a power off state to receive and decode the RCM and/or EMM so as to acquire permission for network access and transmit information on the amount used to the RSMS, and being automatically turned off after completing the transmission of the information.

In another aspect, the present invention provides, for use in a conditional access system having a resource subscriber management system and a receiver including a smart card, a conditional access method comprising the steps of: checking whether or not it is a time selected for transmission of an EMM and/or an RCM between said resource subscriber management system and said receiver; powering on said receiver if it is the time selected and receiving and decoding said EMM or RCM; allowing said receiver to receive a request signal of said resource subscriber management system and acquire a permission for network access and then to transmit information on the amount used with respect to the smart card to said resource subscriber management system; and returning said receiver to its original power state after completion of the transmission of the information on the amount used.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a flow chart showing a decoding and transmission of information on the amount used in a CAS according to the present invention.

DETAILED DESCRIPTION OF PREFERRED EMBODIMENT

Reference will now be made in detail to the preferred embodiments of the present invention, examples of which are illustrated in the accompanying drawings.

With reference to the accompanying drawings, preferred embodiments of a CAS and its operation method according to a preferred embodiment of the present invention will now be described.

Figure 1:
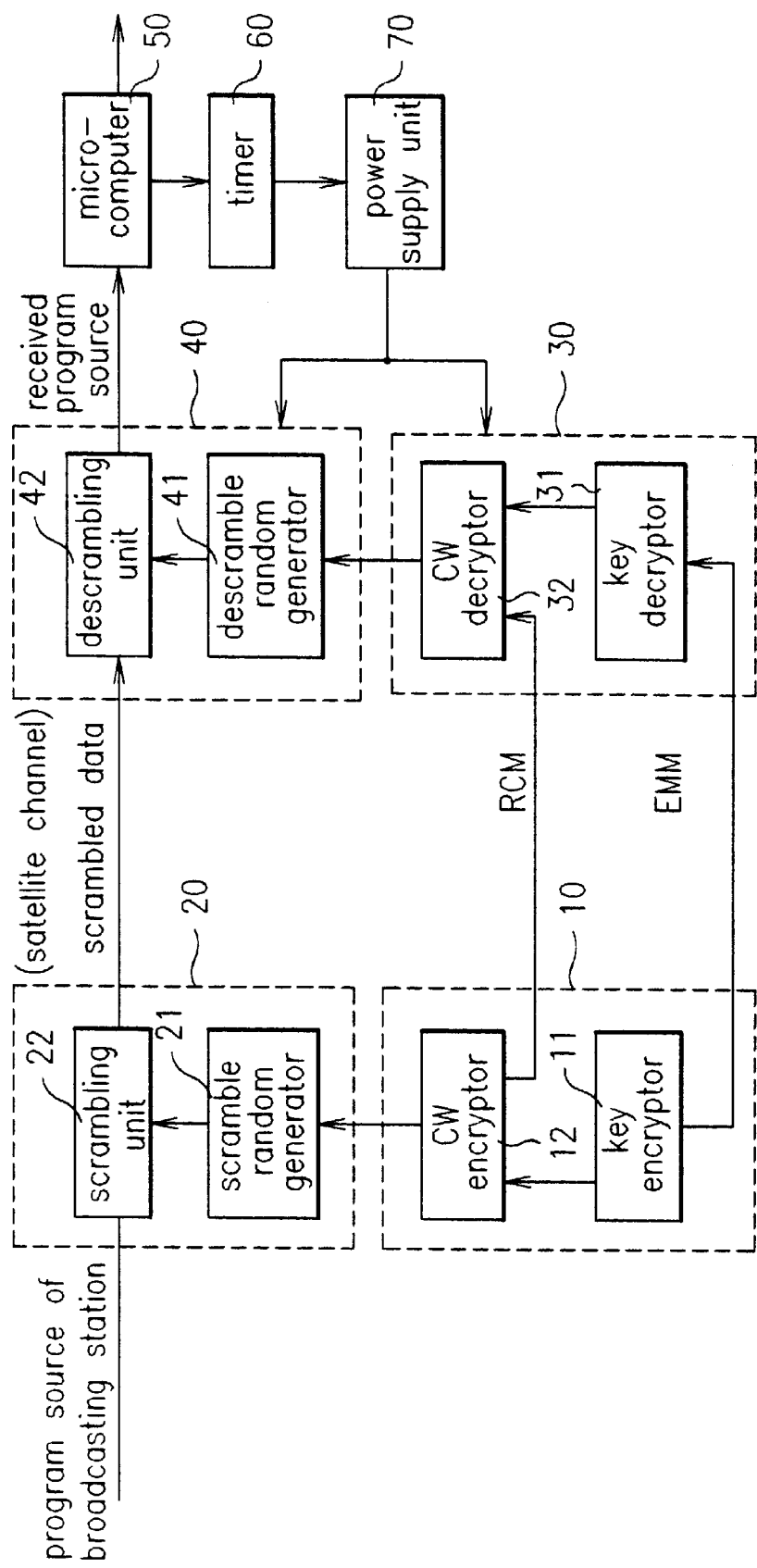
FIG. 1 is a block diagram showing a CAS according to the present invention.

FIG. 1 is a block diagram of the CAS for performing a signal processing method of a pay broadcast management system according to a preferred embodiment of the present invention. The CAS comprises: RSMS 10 including key encryptor 11 for generating an EMM so as to provide a key value and control word (CW) encryptor 12 for generating a CW which will be embedded in an RCM for checking information on the amount used and encoding the key value generated at the key encryptor 11 onto the CW; transmit unit 20 including scramble random generator 21 for generating a random-number according to the CW embedded in the RCM generated at the CW encryptor 12 and scrambling unit 22 for scrambling a sending program source according to the random-number generated at the scramble random generator 21 so as to allow for only particular users to receive the program; smart card 30 including key decryptor 31 for detecting the key value by decoding the received EMM from key encryptor 11 in RSMS 10 and checking whether a smart card is a standard or permitted one and CW decryptor 32 for decoding the received RCM according to the key value decrypted at key decryptor 31 and providing a key value for detecting the information on the amount used; receiving unit 40 including descramble random generator 41 for creating a descramble random-number according to the key value applied from CW decryptor 32 and descrambling unit 42 for reconstructing original data from received scrambled signals in accordance with the created random-number; microcomputer 50 for performing control to display signals received and decoded at descrambling unit 42 as video signals, detecting the information on the amount used after turning on a receiver at a predetermined time using timer 60, receiving the RCM, and performing control to transmit the amount used information to the RSMS; and power supply unit 70 for supplying power to respective smart card 30 and receiving unit 40 at a predetermined time according to a control signal of microcomputer 50.

The EMM is accessed to each smart card via a telephone line or a satellite channel. The EMM contains information necessary for creating a CW required when descrambling from the RCM. The RCM contains information of result of encrypting the CW.

In such configuration as shown in FIG. 1, primarily, key encryptor 11 in RSMS 10 which provides pay programs and manages information on the amounts used by subscribers generates a key value which can be descrambled by smart card 30 in a receiving party, embeds the key value in an EMM for checking whether or not a decoder in the receiving party is legal, and supplies the EMM containing the key value to respective CW encryptor 12 and smart card 30. CW encryptor 12 generates a CW to be embedded in an RCM for checking information on the amount used and encodes the key value generated by key encryptor 11 onto the CW before transmitting the CW to respective scramble random generator 21 in transmitting unit 20 and Cw decryptor 32 in smart card 30.

Scramble random generator 21 generates a random-number by putting the key value encrypted at CW encryptor 12 as an initial value and outputs the random-number to scrambling unit 22. The scrambling unit 22 scrambles a program source of a transmitting party in accordance with the random-number before transmitting the program over a satellite channel.

In the receiving party, key decryptor 31 in smart card 30 decrypts the key value embedded in the EMM to check whether or not smart card 30 is standard or permitted one and outputs the decrypted key value to CW decryptor 32. CW decryptor 32 decodes the RCM according to the key value and detects information on the amount used before outputting the key value to descramble random generator 41 in receiving unit 40. Descramble random generator 41 generates a random-number by putting the key value as an initial value. Descrambling unit 42 mixes the generated random-number with scrambled data transmitted over the satellite channel and reconstructs receivable original data. Consequently, a regular subscriber can receive the pay programs. If the RCM and EMM are not received, there occurs a case that the subscriber is not allowed to watch the pay program.

During the above procedure, key decryptor 31 and CW decryptor 32 in smart card 30 decode the RCM and/or EMM received from RSMS 10 to decrypt scrambled signals to identify a present status of the smart card, that is, whether or not the smart card is suitable for the pay broadcast and then the receiver informs RSMS 10 of how much amount of money for the pay broadcast is left in the present smart card.

To overcome the problem in that a receiver should always be "ON" to receive the RCM, RSMS 10 predetermines a time period for RCM transmission according to an agreement in a broadcasting industry and informs microcomputer 50 in a receiver of the predetermined RCM transmission time period. For example, if RSMS 10 informs the receiver that it will transmit the RCM for up-loading of information on the amount used at a time period when a communication line is not busy (i.e. AM 3:00~4:00), microcomputer 50 receives and stores this information in the memory and starts timer 60.

Figure 2:
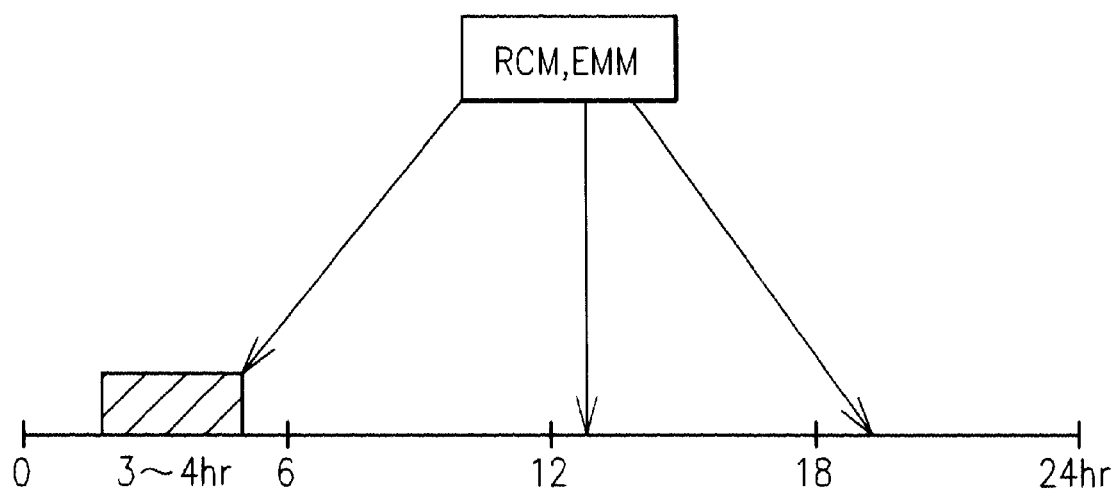
FIG. 2 shows exemplary times at which an RCM and/or EMM are/is transmitted for transmission of information on the amount used according to the present invention.

FIG. 2 shows time periods when timer 60 should be turned on to receive the RCM and/or EMM for transmission of information on the amount used according to the present invention. The illustrated exemplary time periods may be optionally determined. For example, RSMS 10 selects a time period from 3:00 am to 4:00 am while it is seemed that traffics for transmission of information on the amounts used on the communication line are least or a time period from 7:00 pm to 8:00 pm which is prime time, informs microcomputer 50 of the selected time period, and transmits the RCM which is a signal for requesting transmission of the information on the amount used and the EMM containing a CW at the selected time period. The receiver then checks its power status at the selected time period. If the power of the receiver is "OFF", the power of the receiver is automatically turned on so as to allow the receiver to receive the RCM and/or EMM and transmit the information on the amount used.

If the request signal is transmitted three times per day, every time the information on the amount used may be transmitted or at least one time the information is controlled to be transmitted, thus preventing the smart card from being locked when there is no acknowledgement for the request signal three times or more.

Figure 3:
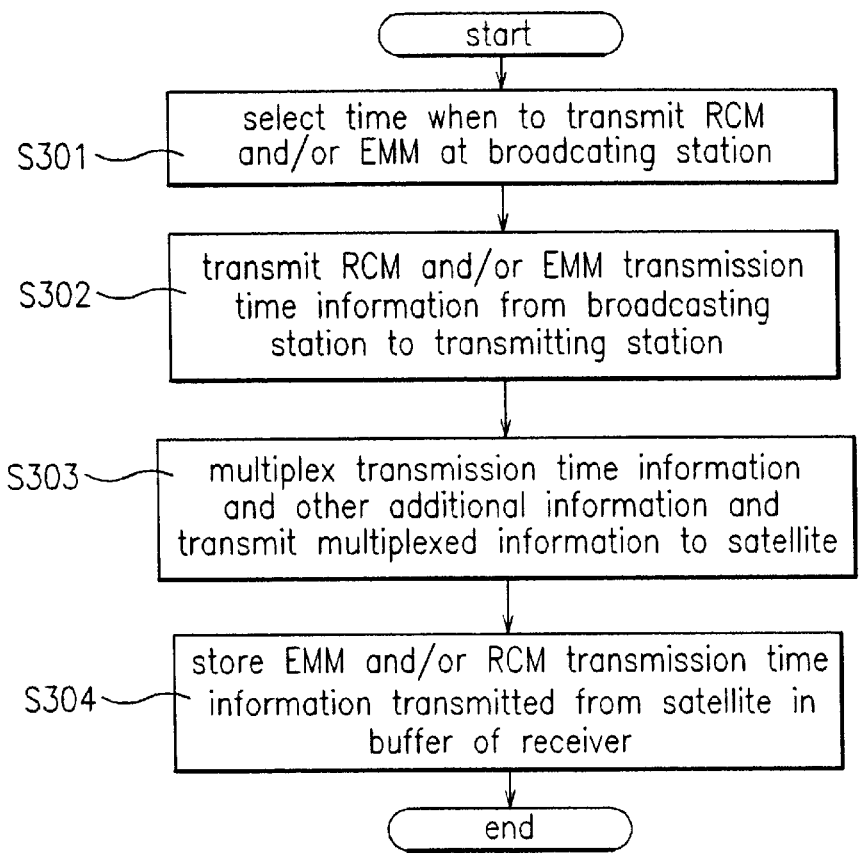
FIG. 3 is a flow chart showing how information on a transmission time period of the EMM and/or RCM is transmitted according to the present invention.

FIG. 3 is a flow chart showing how information on a transmission time period of the EMM and/or RCM is transmitted in the CAS according to the preferred embodiment of the present invention. A broadcasting station selects a time when to transmit the RCM and/or EMM which are/is information for detecting the amounts used by users (S301) and transmits the time information to a transmitting station (S302). The transmitting station multiplexes the transmission time information received and other additional information and sends the multiplexed information to a satellite (S303). A receiver demultiplexes the received signals from the satellite and stores divided EMM and/or RCM transmission time information in a buffer (S304).

Figure 4:
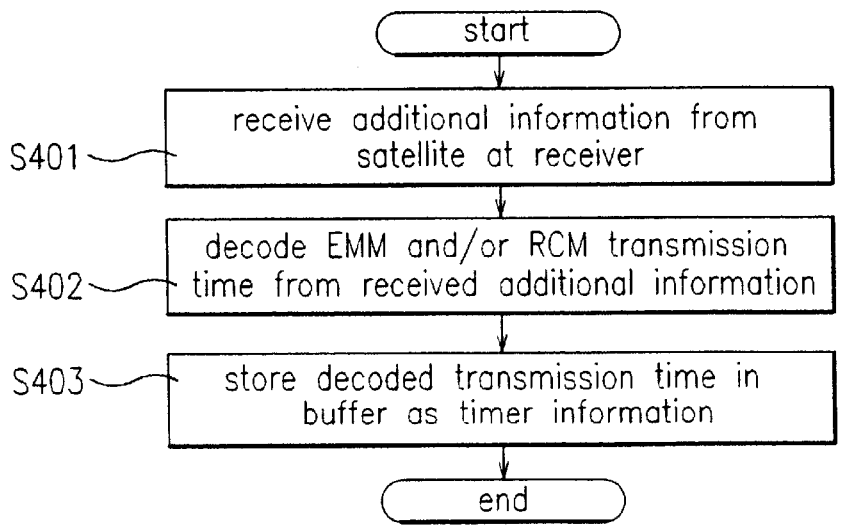
FIG. 4 is a flow chart showing how information of a transmission time period of the EMM and/or RCM is stored according to the present invention.

FIG. 4 is a flow chart showing how information of transmission time of the EMM and/or RCM is stored in the CAS according to a preferred embodiment of the present invention. If the RCM and/or EMM transmission time information multiplexed with the additional information is transmitted via the satellite, the receiver receives the information (S401) and decodes the RCM and/or EMM transmission time information from the received additional information data (S402). Once the decoding is completed at the step S402, the decoded transmission time is stored in a timer information buffer within the receiver (S403).

Figure 5:
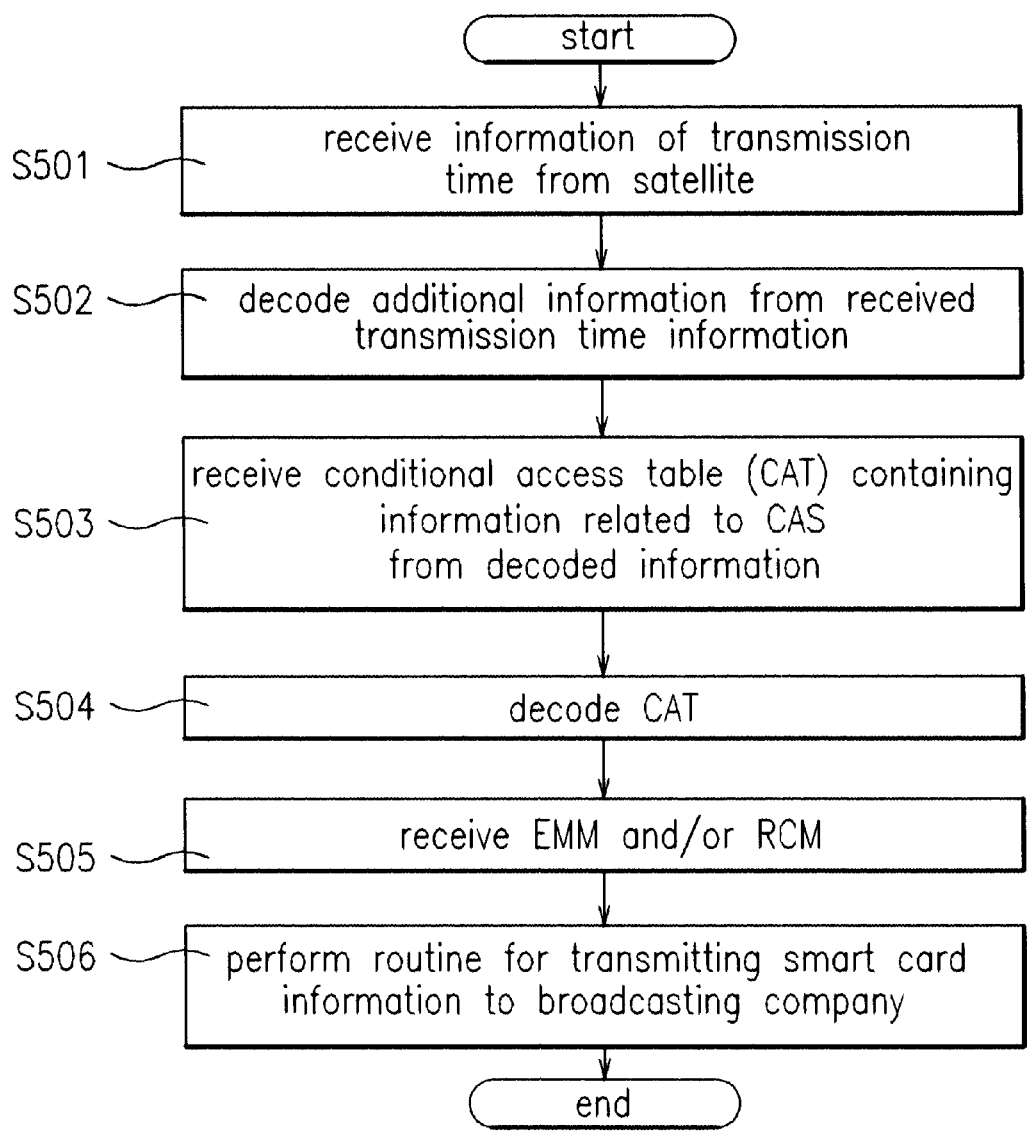
FIG. 5 is a flow chart showing the procedure of receiving the EMM and/or RCM according to the present invention.

FIG. 5 is a flow chart showing the procedure where the receiver receives the EMM and/or RCM according to timer information in the CAS according to a preferred embodiment of the present invention. Once the receiver is turned on in accordance with the timer information, the receiver receives a message from the satellite (S501). Once the message is received, the receiver decodes the additional information from the message (S502), receives a conditional access table (CAT) containing information related to the CAS from the decoded information (S503), and decodes the CAT (S504). The receiver receives the EMM and/or RCM from the decoded CAT (S505). In other words, at a predetermined time based upon the decoded CAT is performed a routine for transmitting smart card information to the broadcasting station (S506).

FIG. 6 is a flow chart showing a procedure of receiving and decoding the RCM in the CAS according to a preferred embodiment of the present invention. The receiver may be in a power-off state (S601) or in a power-on state. It is not necessary that the receiver is always in the power-on state.

At this time, microcomputer 50 continuously checks whether or not the time of timer 60 coincides with the RCM transmission time informed by RSMS 10 (S602). If the two times coincides, microcomputer 50 stores a power state of the receiver, that is, whether a current power state of the receiver is "ON" or "OFF" (S603). If the receiver's power state stored is "OFF" (S604), microcomputer 50 controls power supply unit 70 so as to automatically turn on the power of the receiver (S605). If the receiver's power state stored is "ON", it is not necessary to turn on the receiver.

When the receiver is in the "ON" state, key decryptor 31 and CW decryptor 32 in smart card 30 receive a signal transmitted via the satellite channel (S606). If the received signal is the RCM or EMM (S607), this message is decoded (S608), permission for network access is acquired (S609), and the information on the amount used registered in smart card 30 is transmitted to RSMS 10 via the communication line (S610).

Once the transmission of information is completed, RSMS 10 transmits a receive completion message via the satellite channel and the receiver receives the message (S611). Once the receiver receives the message, it returns to an original power state (S612). In other words, if the receiver was in the power off state at the step S603, microcomputer 50 controls power supply 70 so as to cut off the power supplied to the receiver while the power state of the receiver is maintained if the receiver was in the power on state at the step S603.

The receiver is automatically turned on or off at midnight when a user does not usually use the receiver to receive the RCM and/or EMM and perform functions such as transmission of the information on the amount used and check of a state of the smart card, thus minimizing power consumption.

RSMS 10 according to the present invention previously transmits to a receiver a time message for notifying a transmission time period for the RCM and/or EMM which are/is non-periodically transmitted at a predetermined time via the satellite channel. The receiver then decodes the time message and stores the decoded time. If a time of timer 60 coincides with the time stored, the receiver is automatically turned on, receives and decodes the RCM and/or EMM signal(s), and transmits the information on the amount used to the RSMS. An agreement between broadcasting companies is not required. If the request signal is transmitted to the receiver three times per day, the receiver receives the RCM and/or EMM and informs RSMS 10 of the information on how much the smart card is used every time and, at the same time, the power consumption of the receiver can be minimized.

According to the CAS of the present invention, the RSMS previously selects a time when to transmit the RCM and/or EMM for detecting the information on the amount used, informs the receiver of the time via the satellite channel, and transmits the RCM and/or EMM at the predetermined time. The receiver is automatically turned on at a predetermined time to receive the RCM and/or EMM. The receiver then decodes the RCM and/or EMM and transmits the information on the amount used to the RSMS. After completing the transmission of the information, the receiver is automatically turned off. Alternatively, the RSMS previously informs the receiver of a transmission time for the RCM and/or EMM which are/us non-periodically transmitted at a predetermined time via the satellite channel and the receiver stores the informed time. At the time corresponding to the time stored in the receiver, the receiver is automatically turned on to receive and decode the RCM and/or EMM and transmit the information on the amount used to the RSMS. After completing the transmission of the information, the receiver is automatically turned off. Consequently, since the receiver does not need to be in a power on state all the time, the present invention is able to minimize the power consumption of the receiver.

Additionally, the CAS of the present invention allows for the receiver to receive and decode the RCM and/or EMM and transmit the information on the amount used to the RSMS at least one time when the transmission of the RCM and/or EMM to the receiver is performed several times a day, thus preventing locking of the smart card.

It will be apparent to those skilled in the art that various modifications and variations can be made in the conditional access system and method of the present invention without deviating from the spirit or scope of the invention. Thus, it is intended that the present invention cover the modifications and variations of this invention provided they come within the scope of the appended claims and their equivalents.

What is claimed is:

1. A conditional access system comprising:
   a resource subscriber management system for predetermining a first time period to transmit an entitlement management message (EMM) for checking whether or not a decoder in a receiving party is legal and a second time period to transmit a receive control message (RCM) for checking information on the amount used, transmitting the first and second time periods to each receiver via a satellite channel, and providing a key value for scrambling;
   a transmitting unit for generating a random-number from said key value and scrambling program sources of a broadcasting station before transmitting them to each receiver;
   a receiver for receiving the first time period and second time period and decoding said RCM and/or EMM, checking whether or not a smart card is permitted, and transmitting information on the amount used by a user registered in the smart card to said resource subscriber management system and, at the same time, for decrypting said key value and generating a random-number using the decrypted key value to reconstruct original data from scrambled data; and
   a power supply unit for turning on at the beginning of the first and second time periods and supplying power to said receiver during the first and second time periods.

2. A conditional access system according to claim 1, wherein said resource subscriber management system pre-determines the second and first time periods for transmission of the RCM and EMM, respectfully, for checking said information on the amount used, informs each receiver of the first and second time periods via the satellite channel and transmits the RCM and/or EMM at the predetermined first and second time periods, respectfully.

3. A conditional access system according to claim 1, wherein said receiver checks its power state when a transmission time of the RCM and/or EMM coincides with a third time of an inner timer, controls said power supply unit so as to automatically turn on its power if a state of the power is "OFF", the receiver receiving and decoding said RCM and/or EMM and transmitting the information on the amount used to said resource subscriber management system after acquiring a permission for network access, and automatically turns off the power after completion of the transmission.

4. A conditional access system according to claim 3, wherein said receiver receives multiplexed additional information from a satellite, decodes RCM and/or EMM transmission time periods from the received additional information data, and stores timer information in a buffer.

5. A conditional access system according to claim 1, wherein said broadcasting station selects RCM and/or EMM transmission time(s) and transmits the selected time(s) to said resource subscriber management system and said resource subscriber management system multiplexes the transmission time information and other additional information and transmits multiplexed information to a satellite.

6. A conditional access system comprising:
- a resource subscriber management system for transmitting to each receiver via a satellite channel a first time period for transmitting an entitlement management message (EMM) and a second time period for transmitting a receive control message (RCM), said EMM being non-periodically transmitted at a predetermined time to check whether or not a decoder in a receiving party is legal, said RCM being non-periodically transmitted at a predetermined time to check information on the amount used, and, at the same time, for providing a key value for scrambling;
- a transmitting unit for generating a random-number from said key value and scrambling program sources of a broadcasting station before transmitting them to each receiver;
- a receiver for receiving and decoding said RCM and/or EMM, checking whether or not a smart card is permitted, and transmitting information on the amount used by a user to said resource subscriber management system, said information being registered in the smart card, and, at the same time, for decrypting said key value and generating a random-number using the decrypted key value to reconstruct original data from scrambled data; and
- a power supply unit for turning on at the beginning of the first and second time periods and supplying power to said receiver during the first and second time periods.

7. A conditional access system according to claim 6, wherein said resource subscriber management system previously informs each receiver of transmission time periods of the RCM and EMM, which are non-periodically transmitted at the predetermined times, via the satellite channel and transmits the RCM and EMM.

8. A conditional access system according to claim 6, wherein said receiver stores the time information received, checks its power state when a time of a timer coincides with the stored time, controls said power supply unit so as to automatically turn on the power if the power is "OFF", the receiver receiving and decoding said RCM and/or EMM and transmitting the information on the amount used to said resource subscriber management system after acquiring a permission for network access, and automatically turning off the power after completion of the transmission.

9. A conditional access system according to claim 6, wherein said broadcasting station selects RCM and/or EMM transmission time(s) and transmits the selected time(s) to said resource subscriber management system and said resource subscriber management system multiplexes the transmission time information and other additional information and transmits multiplexed information to a satellite.

10. A conditional access method for a system having a resource subscriber management system and a receiver that includes a smart card, the method comprising the steps of:
- predetermining a first time period to transmit an entitlement management message (EMM) and a second time period to transmit a receive control message (RCM) and transmitting the predetermined time periods to the receiver;
- scrambling program sources of a broadcasting station with a random-number generated from a key value and transmitting the scrambled sources to the receiver;
- turning on a power supply unit at the beginning of the first and second time periods, the power supplying power to the receiver during the first and second time periods;
- receiving said RCM and EMM from the management system during the first and second time periods, respectively;
- checking whether the smart card is permitted and transmitting information on the amount used by a user registered in the smart card to the management system by decoding the received RCM and EMM; and
- decrypting said key value and generating a random-number using the decrypted key value to reconstruct original data from the scrambled sources.

11. The method of claim 10, wherein the predetermined time periods are transmitted to the receiver via a satellite channel.

12. The method of claim 10, wherein the key value is originally provided by the resource subscriber management system.

13. The method of claim 10, wherein the predetermined time periods being transmitted to the receiver are included in multiplexed additional information that the management system transmits to the receiver, the transmitted time period being stored in a buffer of said receiver.

* * * * *